United States Patent [19]

Engler et al.

[11] 4,142,783

[45] Mar. 6, 1979

[54] REVERSIBLE ELECTROCHROMIC DISPLAY DEVICE HAVING MEMORY

[75] Inventors: Edward M. Engler, Wappingers Falls; Frank B. Kaufman, New York, both of N.Y.

[73] Assignee: International Business Machines Corporation, Armonk, N.Y.

[21] Appl. No.: 801,943

[22] Filed: May 31, 1977

[51] Int. Cl.$^2$ .......................... G02F 1/17; G02F 1/23
[52] U.S. Cl. ............................ 350/357; 252/408
[58] Field of Search .............. 350/357, 354; 252/408, 252/300; 96/90 R

[56] References Cited

U.S. PATENT DOCUMENTS

| | | | |
|---|---|---|---|
| 3,443,859 | 5/1969 | Rogers | 350/357 |
| 3,451,741 | 6/1969 | Manos | 350/357 |
| 3,712,709 | 1/1973 | Kenworthy | 350/357 |
| 3,806,229 | 4/1974 | Schoot et al. | 252/408 |
| 3,824,099 | 7/1974 | Champ et al. | 252/408 |
| 3,837,851 | 9/1974 | Shattuck et al. | 252/408 |
| 3,843,566 | 10/1974 | Barrett | 260/2.1 E |
| 3,904,373 | 9/1975 | Harper | 252/408 |
| 3,944,333 | 3/1976 | Leibowitz | 350/357 |
| 4,018,508 | 4/1977 | McDermott et al. | 350/357 |
| 4,033,673 | 7/1977 | Seki | 350/357 |
| 4,036,648 | 7/1977 | Engler et al. | 252/408 |
| 4,037,928 | 7/1977 | Champ et al. | 350/357 |
| 4,093,358 | 6/1978 | Shattuck et al. | 350/357 |

FOREIGN PATENT DOCUMENTS

| | | | |
|---|---|---|---|
| 2504905 | 7/1976 | Fed. Rep. of Germany | 350/357 |
| 403034 | 7/1974 | U.S.S.R. | 252/408 |

OTHER PUBLICATIONS

Kaufman, F. B., et al., IBM Tech. Discl. Bull., vol. 20, No. 5, pp. 2001-2004, (Oct., 1977).
Green, D. C., et al., IBM Tech. Discl. Bull., vol. 20, No. 3, p. 1226, (Aug. 1977).
Scott, B. A., et al., IBM Tech. Discl. Bull., vol. 20, No. 3, pp. 1223-1225, (Aug., 1977).
Wudl, F., et al., J. Amer. Chem. Soc., vol. 94, No. 2, pp. 670-672, (Jan. 26, 1976).

*Primary Examiner*—Benjamin R. Padgett
*Assistant Examiner*—T. S. Gron
*Attorney, Agent, or Firm*—Hansel L. McGee

[57] ABSTRACT

This invention is concerned with a reversible electrochromic display device wherein its electrochromic activity is derived from an electrochromic active molecules which are attached to a porous polymeric resin.

23 Claims, No Drawings

REVERSIBLE ELECTROCHROMIC DISPLAY DEVICE HAVING MEMORY

BACKGROUND OF THE INVENTION

Field of Invention

The invention relates to a novel reversible electrochromic display device. The device is characterized by having a layer of porous polymeric resin or support to which an electrochromic active molecule is bound, coated on a viewing electrode.

Prior Art

The use of organic materials in electrochromic display devices has been encouraged because of their potential low cost, and low power requirements. However, the potential of these devices have not yet been realized.

A review of organic electrochromic devices can be found in the publication entitled "Nonemissive Electrooptic Displays," A. R. Kmetz and F. K. vonWillisen (Editors), Plenum Press, New York (1975). Two types of devices are described in the above-mentioned publication and for simplication are classified hereinafter as Class I and Class II.

The simpliest approach to these would be optimal devices is the Class I configuration. In these devices a thin layer electrochemical cell with optically transparent electrodes is filled with a solvent supporting electrolyte and an uncolored organic donor/acceptor pair of molecules. These molecules can be reversibly made to form a highly colored oxidant and a reductant at the respective electrode surfaces. Color develops in these cells when a voltage is applied at a particular point on the electrodes to form the colored oxidized and reduced pair. Development of color depends on and is limited by, diffusion of the electroactive organic molecules to the electrode surface. The intensity of color is dependent upon and is limited by the molecules' extinction coefficient and the solubility in the electrolyte solution. Examples of this class of devices are exhibited in U.S. Pat. No. 3,451,741 and in U.S. Pat. No. 4,093,358 issued June 6, 1978. In the former reference the organic materials used are hydroxyaryl imidazole compounds and in the latter reference, pyrazoline compounds are used. The latter reference discloses that the use of pyrazoline type compounds gives increased efficiencies.

In these Class I devices, after diffusional formation of the colored ions at the respective electrode surface occurs, the colored oxidant and reductant diffuses into the bulk solution in the center of the cell. The colored oppositely charged ions which are formed at the electrode surfaces, annihilate each other via electron transfer to reform the uncolored neutral species. Therefore the image persists until this diffusional annihilation occurs. To maintain the desired image requires a "refresh" process whereby voltage pulses are applied at the desired point on the electrode surfaces to maintain the neutral-ionic-neutral species creation-annihilation cycle.

The major disadvantage of Class I devices is that it requires a diffusional process in an all solution environment. Because of this process constant cycling is required for memory in the display. Additionally, constant recycle leads to device degradation due to uncontrolled side reactions, sensitivity to solvent contaminants and impurities. Furthermore, the constant recycle program requires energy and does not allow real storage of the displayed information.

The Class II devices partially solves some of the problems ascribed above the Class I devices. In these devices, after electron transfer at the electrode surface, diffusion into the bulk solution is prevented by the production of a colored, ion-radical salt on the electrode surface. Typical of Class II devices are those disclosed in U.S. Pat. No. 3,806,229. The electroactive species used in these devices are viologen acceptors. These devices have the beneficial property of memory, however, they still involve a diffusional process to form the colored state. Furthermore, reproducible formation of the solid phase on the electrode surface and reproducible removal of this solid phase by voltage reversal result in poor lifetimes for the devices. A detailed discussion of these devices is found in the publication to K. Belinko, Appl. Phys. Letters, 29 p. 363 (1976).

The present invention provides an uniquely attractive solution to the problems of the above-mentioned prior art electrochromic display devices.

SUMMARY OF THE INVENTION

According to the present invention, there is provided an electrochromic display device which features a very high concentration of electrochromic active species covalently bound in a porous solid state environment. The diffusion of the electrochromic active species of the present invention is prevented by their attachment to a polymer support. The present display devices have the advantages of virtually no toxicity by virtue of the attachment of the electrochromic active species to the polymer resins. The electrochromic active species while attached to the insoluble polymer, is in intimate contact with the solvent phase due to the porosity of the polymer resins. This is important for the passage of ions through the polymer resin in order to maintain charge neutrality and distinguishes this invention from the usual polymer films where such diffusion is slow and retards the response of the electrochromic effect. Thus, in this two phase configuration the electrochromic active specie is not limited or dependent upon solution diffusion, solubility considerations, precipitate formation or solvent type in contrast to all similar prior art displays for which the electrochromic active specie is an organic substance. Additionally, because of the high concentration of polymer bound electrochromic active species an image of intense color is developed.

The above stated advantages of the present invention is due to the two-phase nature of the device, i.e., an insoluble porous polymer with bound electrochromic active species-solvent and an electrolyte.

More specifically, the present invention relates to a reversible, electrochromic display device comprising:

(a) A unit cell having a working or viewing transparent electrode, and at least one spaced apart counter electrode.

(b) Means for applying an electric field across the cell and for reversing electrode polarity.

(c) A layer of an electrochromic active specie bound to a porous polymer resin coated on said viewing electrode; and (d) an electrolyte to maintain charge neutrality to thereby allow the transport of electrons between said electrodes.

In the present invention, the electrochromic coloration reaction can take place due to the giving up or donation of an electron by an electrochromic active donor compound to the viewing electrode. It should be noted that while the invention is described using donor molecules acceptor electrochromic active species can similarly be utilized.

The donor molecules that can be used in this invention are those which can be characterized as having the following specific molecular properties:

(a) Those that are capable of reversible electron oxidation to a stable radical cation, where the cation absorbs visible light differently from the neutral species;

(b) have an oxidation potential of from about 0.1V to about 1V measured against a standard calomel electrode; and (c) must have a functional group which when reacted with a porous polymer support will be bound thereto. Functional groups contemplated by the present invention include hydroxyl, carboxyl, amino groups and the like.

The acceptor molecules that can be used in this invention are those which can be characterized as having the following specific molecular properties:

(a) Those that are capable of reversible electron reduction to a stable radical anion where the anion absorbs visible light differently from the neutral species;

(b) have a reduction potential of from about 0.1V to about 1V measured against a standard calomel electrode; and (c) must have a functional group which when reacted with a porous polymer support will be bound thereto. Functional groups comtemplated by the present invention include hydroxyl, carboxyl, amino groups and the like.

Typical electroactive acceptor materials which may be used include p-tetracyanoquimodimethide (TCNQ), p-benzoquinone and bis(dithiolene) nickel. Specifically the preferred acceptors can be selected from hydroxyethyl-p-tetracyanoquinodimethane, hydroxyphenyl-p-benzoquinone and carboxy bis (dithiolene) nickel.

Specifically the electrochromic active donor species can be selected from a wide variety of compounds. For the purposes of the present invention triaryl pyrazolines having hydroxyl, carboxyl or amino groups on the phenyl ring at the 1, 3 or 5 positions can be used, e.g., 1, 3-di-(p-methoxyphenyl)-5-(p-hydroxyphenyl)-$\Delta^2$-pyrazoline,
1, 5-di-(p-methoxyphenyl)-3-(p-hydroxyphenyl)-$\Delta^2$-pyrazoline,
3, 5-di-(p-methoxyphenyl)-1-(p-hydroxyphenyl)-$\Delta^2$-pyrazoline,
1, 3-di-(p-methoxyphenyl)-5-(p-carboxyphenyl)-$\Delta^2$-pyrazoline,
1, 5-di-(p-methoxyphenyl)-3-(p-carboxyphenyl)-$\Delta^2$-pyrazoline,
3, 5-di-(p-methoxyphenyl)-1-(p-carboxyphenyl)-$\Delta^2$-pyrazoline,
1, 3-di-(p-methoxyphenyl)-5-(p-aminophenyl)-$\Delta^2$-pyrazoline,
1, 5-di(phenyl)-3-(p-aminophenyl)-$\Delta^2$-pyrazoline,
1-(p-hydroxyphenyl)-3-(p-methoxystyryl)-5-(p-methoxyphenyl)-$\Delta^2$-pyrazoline,
1-(p-hydroxyphenyl)-3-(p-diethylaminostyryl)-5-(p-diethylaminophenyl)-$\Delta^2$-pyrazoline, tetrathiafulvalene (TTF), its derivatives and Se analogs (TSeF) and its derivatives. For example, tetrathiafulvalenecarboxylic acid (TTFCO$_2$H), tetraselenafulvalenecarboxylic, (hydroxymethyl)-tetrathiafulvalene (TTFCH$_2$OH), (hy-droxymethyl)-tetraselenafulvalene (TSeFCH$_2$OH), (p-hydroxyphenyl)-tetrathiafulvalene (TTFC$_6$H$_4$OH), (p-hydroxyphenyl)-tetraselenafulvalene (TSeFC$_6$H$_4$OH), (p-aminophenyl)-tetrathiafulvalene (TTFC$_6$H$_4$NH$_2$), (p-carboxyphenyl)-tetrathiafulvalene (TTFC$_6$H$_4$CO$_2$H).

The above compounds are described for purposes of demonstrating the inventors use. It would be obvious to others to use similar compounds meeting the requirements set forth above.

The porous polymeric resin may be a homopolymer or copolymer having skeletal functional groups or side chains having functional groups capable of reacting with the functional groups of the electrochromic active molecules thereby binding said molecules thereto. The polymer resin can be cross-linked with an appropriate disubstituted monomer to provide a porous insoluble matrix. The amount of crosslinking monomer added during polymerization controls the degree of porosity of the resins. A specific polymeric resin which may be used among others, is a copolymer of styrene and chloromethylated styrene, e.g.

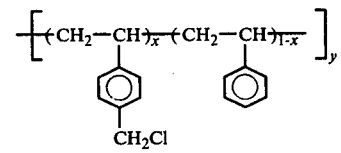

When this polymeric material is used the value of x and y can be varied to effect the intensity of the colors formed by the electrochromic active molecule. For example, when x/y >> 1 a large number of molecules are attached to the base polymer resin and are in close proximity to one another thus providing high intensity color when a voltage is applied across the cell. Conversely when x/y << 1 only a small number of molecules are attached and are widely dispersed, thereby providing low intensity color. Typically, the polymer is cross linked with divinyl benzene from about 0.25% to about 10%.

There are two basic kinds of synthetic procedures for covalently attaching the electrochromic active molecules to the polymer resin. In (1),

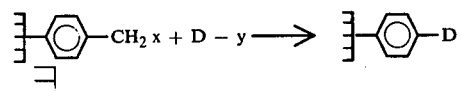

where ⊐ is a polymer resin, x is a halogen, D is a electrochromic active molecule, and y is a functional group capable of coupling D to the benzene ring. In this procedure, preformed and appropriately functionalized donor molecules (D-Y) are reacted in single-step coupling procedures with the polymer resin. In this approach, the groups -x and -y are chosen so as to lead to coupled products. Binding to the polymer matrix is accomplished in one step. In an alternate method, (re reactions 2-4), the desired electrochromic active molecule is synthesized from polymer precursors directly on the resin. Thus, functionalized electrochromic active species are not required; however, multiple polymer reactions become necessary.

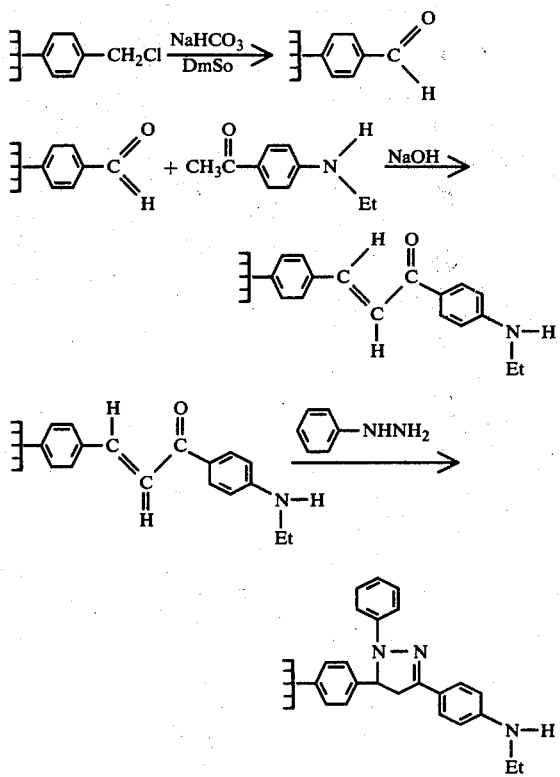

Both these synthetic approaches are flexible enough to allow the preparation of families of "homologous" polymer resins since the ability to vary cross linking and the amount of electrochromic active specie substitution follows naturally from the preparative techniques employed. Ready control over electrochromic active specie concentration and intersite distance can be achieved by preselecting either the concentration of reactive polymer sites or by varying reaction conditions in the subsequent coupling step. In addition, both procedures for attachment allow for appropriate choice of donor substitution pattern therefore enabling electrochemical and spectroscopic properties to be varied and optimized.

The materials described herein are electrochromic by virtue of the color changes they undergo when acted on with an applied voltage due to the intimate contact with the electrode surface. Electrochromic active molecules that are free to diffuse in solution can be oxidized electrochemically via direct interaction at an electrode (Reaction 1) or by means of

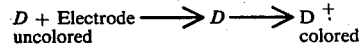 (1)

electron transfer with a mediator (m) that has reacted at the electrode surface (Reaction 2)

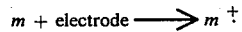 (2a)

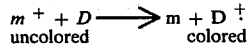 (2b)

In both cases color changes occur, however the electrochromic effect is only temporary since the colored molecules rapidly diffuse into the uncolored regions and the written image is lost. In the new materials described here, both these modes of electrochromic writing are possible and have been observed.

The bound nature of the electrochromic active molecules in a porous polymeric matrix prevents diffusion of the image and thus leads to the intrinsic memory capability of these materials, unlike the unbound solution types of Class 1 and Class II. Presumably, direct reaction with the electrode surface is possible because of the high electrochromic active specie coverage of the porous polymer resins.

Although the polymer resins are insoluble granular materials and thus cannot be coated or cast in the manner of normal polymers, we have found that the usual reaction conditions used to prepare the electrochromic active specie polymer resins lead to polymers whose physical form and shape make them amenable to the formation of polymer films when swelled in solvents such as benzene, $CH_2Cl_2$ etc., and which adhere to surfaces glass, metal, paper etc. These coating processes give films having good electrode contact which are readily adherent to a wide variety of surfaces.

As is known to the prior art, the electrochromic reaction requires an electrolyte that is soluble in an appropriate solvent. Typical electrolytes that can be used in the present invention are tetrabutylammonium perchlorate ($BuyNClO_4$),
perchloric acid ($HClO_4$),
sodium fluoroborate ($NaBF_4$),
sodium perchlorate ($NaClO_4$),
sodium hexafluorophosphate ($NaPF_6$),
tetraethylammonium fluoroborate ($EtyNBF_4$),
tetraethylammonium hexafluorophosphate ($EtyNPF_6$) and
tetrathylammonium perchlorate ($EtyNClO_4$).

The solvents which can be used can be protic or aprotic solvents which are polar or non polar. One limiting factor is the solubility of the electrolyte.

Typical useful solvents include methyl ethyl ketone, methylene chloride, ethanol, dimethylformamide, dimethylsulfoxide, N, N-dimethylacetomide tetrahydrofuran and acetonitrile.

The device comprises a cell having at least two electrodes i.e., a working, and a counter electrode. A reference electrode can also be included. The electrodes may be isolated from each other by means of a membrane, such as a porous frit. The working electrode or the electrode on which the electrochromic effect will be produced can be a conductive metal plate e.g., Pt, Au and Cu foils, an optically transparent conductor such as $SnO_2$, $InO_2$, or a conductive film e.g., Pt, Au or minigrid electrodes. The polymeric resin material having electrochromic active molecules attached thereto is coated on the working electrode to produce an electrochromic effect when an electric field is applied across the electrodes. The reference electrode can be the standard calomel cell or other prior art standard electrodes and the counter electrode can be a Pt wire.

The coating of the porous polymer resins can be performed in the following fashion. The resin with bound electroactive species is swelled in benzene or methylene chloride. This suspension is deposited dropwise onto a transparent electrode. The solvent is allowed to slowly evaporate to give a fairly uniform polymer film with good adhesion characteristics.

The foregoing and other objects, features and advantages of the invention will be apparent from the following more particular description of a preferred embodiment of the invention.

EXAMPLES

The following examples are given solely for purposes of illustrations and are not to be considered limitations on the inventions, many variations of which are possible without departing from the spirit or scope thereof.

EXAMPLE 1

Synthesis of 1,3-(p-methoxyphenyl)-5-(p-hydroxyphenyl)-$\Delta^2$-pyrazoline

In a typical sample preparation this pyrazoline is prepared by reaction of the appropriate disubstituted chalcone, 4-hydroxy 4' methoxy chalcone, with the hydrochloride salt of p-methoxyphenyl hydrazine.

The chalcone is prepared by adding 5 grams p-methoxy acetophenone and 3.6 grams p-hydroxy benzaldehyde to a solution containing 20 ml $H_2O$, 10ml EtOH and 2.4g NaOH. The mixture is heated to 70° C. for 2 hours and then allowed to stir at room temperature under nitrogen for 3 days. Then the solution is diluted with 30ml $H_2O$ and neutralized with HCl. The orange brown oil produced is crystallized from EtOH to yield 6 grams of yellow crystals, m.p. 177°–179° C. Elemental analysis: Theory, %C = 75.54 %H = 5.51; Found, %C = 75.12, %H = 5.49.

In the preparation of the pyrazoline, 4 grams chalcone and 3 grams of methoxy phenyl hydrazine hydrochloride is refluxed in 125ml absolute EtOH for 24 hours. The solution is magnetically stirred and protected from $O_2$ with a nitrogen atmosphere. To the resulting red-brown solution is added $H_2O$ and extracted with ether until the water layer is colorless. The ether layer is dried with $MgSO_4$ and removed to yield the oily yellow product. Crystallization from EtOH-$H_2O$ resulted in 5 grams of a fluorescent pale yellow solid, mp. 178–180. Elemental analysis, Theory %C = 74.01, %H = 5.63. %N = 7.50%, Found %C = 73.80 %H = 5.85 %N = 7.29.

EXAMPLE 2

One equivalent of 1,3-di-(p-methoxylphenyl)-5-(p-hydroxyphenyl)-$\Delta^2$-pyrazoline, prepared in Example 1, was treated with one equivalent of KOH in 4:1 dioxane-ethanol under nitrogen and refluxed ½ hour. Then, 0.5 equivalent of chloromethylated cross-linked polystyrene resin (1% cross-linked with divinylbenzene and 4.5 milliequivalent of chloromethylated groups per gram of polymer) is added and the solution refluxed under nitrogen for 3 days. The yellow polymer bound pyrazoline is collected by filtering and washed extensively with solvent (dioxane, methanol, water, methylene chloride, ether) and dried in a vacuum oven under nitrogen.

Elemental analysis for nitrogen and chlorine indicated 75% of the available chloromethylated groups were reacted to give the pyrazoline bound to the polymer resin. The pyrazoline bound polymer resin has a similar infrared spectrum as for the starting pyrazoline (except for the -OH absorption which is absent in the polymer bound pyrazoline) with major infrared absorptions at 1610, 1500, 1410, 1385, 1235, 1170, 1125, 1095, 1040, 875, 830, 790 cm$^{-1}$.

EXAMPLE 3

Example 1 is a stepwise synthesis for attaching a triaryl pyrazoline to a polymer resin. Polystyrene, cross-linked with 1% divinylbenzene and functionalized to the extent of 1 milliequivalent of carbaldehyde groups in the para-position of the styrene ring per gram of polymer resin, is heated under nitrogen with stirring in 60% dioxane-water for 1 hour. Then a 2-molar excess of p-(N-ethylamino)-acetophenone is added, and the reaction mixture gently heated for 24 hours. The resin is collected by filtering and washed extensively with dioxane, methanol, water, methylene chloride and ether. The resin is then added to a 1:1:1 mixture of acetic acid, ethanol and dioxane, and a two molar excess of phenylhydrazine added. The reaction is refluxed 12 hours, and the yellow-orange resin collected and washed extensively with protic and aprotic solvents. Elemental analysis showed 0.91% nitrogen present, indicating about 60% of the available carbaldehyde groups were converted to 1,5-diphenyl, 3-(p-N-ethylaminophenyl) $\Delta^2$ pyrazoline which is attached to the polymer resin by the para-position of the 5-phenyl substituent. The identity of the pyrazoline bound to the polymer resin is confirmed by the similarity of its infrared spectrum with unbound pyrazoline.

EXAMPLE 4

Synthesis of cesium salt of tetrathiafulvalene carboxylic acid

The monocarboxylic acid of tetrathiafulvalene was dissolved in 100ml of warm isopropanol. To this solution was added an equivalent of cesium hydroxide in isopropanol. The solution was stirred for 20 minutes and then chilled in an ice-water bath. The golden crystals of the salt precipitate are collected by suction filtration and washed with ether: mp 240 (dec)

EXAMPLE 5

One equivalent of the cesium salt of tetrathiafulvalene carboxylic acid and one equivalent of chloromethylated cross-linked polystyrene (1% cross-linked with divinylbenzene, 4.5 milliequivalence of chloromethylated groups per gram of polymer) are heated at 50°–55° C. in dimethylformamide with stirring under nitrogen for 2 days. The red polymer bound tetrathiafulvalene is isolated by filtering and washed extensively with solvent (DMF, methanol, water, dioxane, methylene chloride, ether) and dried in a vacuum oven under nitrogen. Elemental analysis for sulfur and chlorine indicated 60% of the available chloromethylated sites were reacted. The infrared spectrum of polymer bound tetrathiafulvalene was similar in both positions and intensities of absorptions to the model compound benzyl tetrathiafulvalenecarboxylate. The infrared spectrum had major absorptions at 1700, 1560, 1535, 1490, 1445, 1375, 1270, 1235, 1190, 1045, 795, 775, 760, 725 cm$^{-1}$.

EXAMPLE 6

A cell having working, reference and counter electrodes therein was filled with a solution of $Et_3N^+BF_4^-$ (0.1N) in acetonitrile as the electrolyte. The working electrode was coated with chloromethylated styrene-styrene copolymer resin, which was cross-linked with 1% divinyl benzene, having 1,3 di-(p-methoxyphenyl)-5-(p-hydroxyphenyl)-$\Delta^2$ pyrazoline (as prepared in Example 2) coupled thereto. A porous frit was used to cover the polymer resin and to prevent them from being dislodged into the electrolyte solution. A voltage of about 1–2 volts from a dc power source is applied across the electrodes causing a change in color of the polymer beads from yellow to green. When the voltage was removed to green color persisted. However, on reversal of the voltage, i.e. on applying 2 volts, the yellow color reappeared. This example clearly demonstrates the memory capability and the reversibility of the present device.

EXAMPLE 7

The pyrazoline bound polymer resin is used in a similar cell as in example 6. However, in this case an organic or inorganic donor, which can act as an electron transfer mediator between the electrode and the polymer beads, is dissolved in the electrolyte solution. In general, the oxidation potential of the mediator should be higher than that of the bound donor, however, in some cases the same donor can be used. For example, in the above, when 1,3 di(p-methoxyphenyl)-5-(p-hydroxyphenyl)-$\Delta^2$ pyrazoline is dissolved in the solution, application of 0.6–1.0 volts results in a color change of the polymer bound electroactive species. The color persists in the absence of applied voltage and is erased by the application of reverse voltage.

EXAMPLE 8

A cell as in example 6 was provided except that the pyrazoline bound to porous polymer resin was replaced with tetrathiafulvalene bound polymer resin. When a voltage of from 1 to 2 volts was applied there was a color change from red to black. On reversing the polarity the color changed back to red. In the absence of an applied voltage the color remained black.

What is claimed is:

1. A reversible electrochromic display device having memory comprising:
   (a) a unit cell having a working electrode and a spaced apart counter electrode;
   (b) means for applying an electric field across said electrodes in said unit cell and for reversing polarity;
   (c) a layer of a porous copolymer resin coated on said working electrode, said resin having covalently bonded thereto electroactive molecules selected from the group consisting of pyrazoline derivatives, tetrathiafulvalene and its derivatives, tetraselenafulvalene and its derivatives, p-tetracyanoquinodimethane, nickel bis(dithiolene) and p-benzoquinone, each of which molecules has a functional group which when reacted with said porous copolymer resin becomes covalently bonded thereto through said functional group and functional groups in said porous copolymer resin, said molecules being electrochromically active; and
   (d) a solution of an electrolyte for the transport of electrons from said coated working electrode to said counter electrode.

2. A reversible electrochromic display device according to claim 1 wherein said copolymer resin is comprised of a porous copolymer of chloromethylated styrene and styrene.

3. A reversible display device according to claim 2 wherein the functional group modified electroactive molecule covalently bonded to said porous copolymer resin is 1, 3-di(p-methoxyphenyl), 5-(p-hydroxyphenyl)-$\Delta^2$ pyrazoline.

4. A reversible electrochromic display device according to claim 2 wherein the functional group modified electroactive molecule covalently bonded to said porous copolymer resin is 1, 5 diphenyl, 3-(p-N-ethylaminophenyl) $\Delta^2$ pyrazoline.

5. A reversible electrochromic display device according to claim 2 wherein the functional group modified electroactive molecule covalently bonded to said porous copolymer resin is 1, 5-di(p-methoxyphenyl)-3-(p-hydroxyphenyl) $\Delta^2$-pyrazoline.

6. A reversible electrochromic display device according to claim 2 wherein the functional group modified electroactive molecule covalently bonded to said porous copolymer resin is 3, 5-di(p-methoxyphenyl)-1-(p-hydroxyphenyl)-$\Delta^2$-pyrazoline.

7. A reversible electrochromic display device according to claim 2 wherein the functional group modified electroactive molecule covalently bonded to said porous copolymer resin is 1, 3-di(p-methoxyphenyl)-5-(p-carboxyphenyl)-$\Delta^2$-pyrazoline.

8. A reversible electrochromic display device according to claim 2 wherein the functional group modified electroactive molecule covalently bonded to said porous copolymer resin is 1,3-di(p-methoxyphenyl)-5-(p-aminophenyl)-$\Delta^2$-pyrazoline.

9. A reversible electrochromic display device according to claim 2 wherein the functional group modified electroactive molecule covalently bonded to said porous copolymer resin is 1-(p-hydroxyphenyl)-3-(p-methoxystyryl)-5-(p-methoxyphenyl)-$\Delta^2$-pyrazoline.

10. A reversible electrochromic display device according to claim 2 wherein the functional group modified electroactive molecule covalently bonded to said porous copolymer resin is 1, 5-di(p-methoxyphenyl)-3-(p-carboxyphenyl)-$\Delta^2$-pyrazoline.

11. A reversible electrochromic display according to claim 2 wherein the functional group modified electroactive molecule covalently bonded to said porous copolymer resin is 1-(p-hydroxyphenyl)-3-(p-diethylaminostyryl)-5-(p-diethylaminophenyl)-$\Delta^2$-pyrazoline.

12. A reversible electrochromic display device according to claim 2 wherein the functional group modified electroactive molecule covalently bonded to said porous copolymer resin is the monocarboxylic acid of tetrathiafulvalene.

13. A reversible electrochromic display device according to claim 2 wherein the functional group modified electroactive molecule covalently bonded to said porous copolymer resin is the monocarboxylic acid of tetraselenafulvalene.

14. A reversible electrochromic display device according to claim 2 wherein the functional group modified electroactive molecule covalently bonded to said porous copolymer resin is the monocarboxylic acid dithia diselenafulvalene.

15. A reversible electrochromic display device according to claim 2 wherein the functional group modified electroactive molecule covalently bonded to said porous copolymer resin is (hydroxymethyl)tetrathiafulvalene.

16. A reversible electrochromic display device according to claim 2 wherein the functional group modified electroactive molecule covalently bonded to said porous copolymer resin is (hydroxymethyl)tetraselenafulvalene.

17. A reversible electrochromic display device according to claim 2 wherein the functional group modified electroactive molecule covalently bonded to said porous copolymer resin is (p-hydroxyphenyl)-tetrathiafulvalene.

18. A reversible electrochromic display device according to claim 2 wherein the functional group modified electroactive molecule covalently bonded to said porous copolymer resin is (p-hydroxyphenyl)-tetraselenafulvalene.

19. A reversible electrochromic display device according to claim 2 wherein the functional group modified electroactive molecule covalently bonded to said porous copolymer resin is (p-carboxyphenyl)-tetrathiafulvalene.

20. A reversible electrochromic display device according to claim 2 in the functional group modified electroactive molecule covalently bonded to said porous copolymer resin is (p-aminophenyl)-tetrathiafulvalene.

21. A reversible electrochromic display device according to claim 2 wherein the functional group modified electroactive molecule covalently bonded to said porous copolymer resin is carboxy bis(dithiolene) nickel.

22. A reversible electrochromic display device according to claim 2 wherein the functional group modified electroactive molecule covalently bonded to said porous copolymer resin is hydroxyethyl-p-tetracyanoquinodimethane.

23. A reversible electrochromic display device according to claim 2 wherein the functional group modified electroactive molecule covalently bonded to said porous copolymer resin is hydroxyphenyl-p-benzoquinone.

* * * * *